US012383936B2

(12) United States Patent
Hasegawa et al.

(10) Patent No.: US 12,383,936 B2
(45) Date of Patent: Aug. 12, 2025

(54) CLEANING METHOD AND PROCESSING APPARATUS

(71) Applicant: Tokyo Electron Limited, Tokyo (JP)

(72) Inventors: Tomoya Hasegawa, Yamanashi (JP); Koji Sasaki, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 56 days.

(21) Appl. No.: 18/315,722

(22) Filed: May 11, 2023

(65) Prior Publication Data

US 2023/0390810 A1 Dec. 7, 2023

(30) Foreign Application Priority Data

Jun. 3, 2022 (JP) ................................ 2022-091146

(51) Int. Cl.
*B08B 5/00* (2006.01)
*B08B 7/00* (2006.01)

(52) U.S. Cl.
CPC .............. *B08B 5/00* (2013.01); *B08B 7/0064* (2013.01)

(58) Field of Classification Search
None
See application file for complete search history.

(56) References Cited

U.S. PATENT DOCUMENTS

2019/0067006 A1* 2/2019 Hawrylchak ..... H01J 37/32724

FOREIGN PATENT DOCUMENTS

JP 2014-068045 4/2014

OTHER PUBLICATIONS

Google Patents translation of JP2014068045A (Year: 2024).*

* cited by examiner

*Primary Examiner* — Eric W Golightly
(74) *Attorney, Agent, or Firm* — IPUSA, PLLC

(57) ABSTRACT

A cleaning method for removing a deposit in a processing chamber is provided. The cleaning method includes adjusting a temperature in the processing chamber to a first temperature; supplying a first gas including a hydrogen fluoride gas into the processing chamber in which the temperature is adjusted to the first temperature; adjusting the temperature in the processing chamber to a second temperature that is higher than the first temperature; and supplying a second gas including the hydrogen fluoride gas and an ammonia gas into the processing chamber in which the temperature is adjusted to the second temperature.

4 Claims, 4 Drawing Sheets

CLEANING METHOD AND PROCESSING APPARATUS

CROSS-REFERENCE TO RELATED APPLICATIONS

This application is based on and claims priority to Japanese Patent Application No. 2022-091146, filed on Jun. 3, 2022, the entire contents of which are incorporated herein by reference.

BACKGROUND OF THE INVENTION

1. Field of the Invention

The disclosure herein relates a cleaning method and a processing apparatus.

2. Description of the Related Art

A technique by which deposits adhering to the interior of a processing chamber due to a film deposition process and the like are removed is known (see Patent Document 1, for example). In Patent Document 1, silicofluoride generated when the interior of the processing chamber is cleaned is oxidized by an oxidizing gas, and the oxidized silicofluoride is removed by hydrogen fluoride.

RELATED-ART DOCUMENTS

Patent Documents

Patent Document 1: Japanese Laid-open Patent Application Publication No. 2014-068045

SUMMARY OF THE INVENTION

According to an embodiment of the present disclosure, a cleaning method for removing a deposit in a processing chamber is provided. The cleaning method includes adjusting a temperature in the processing chamber to a first temperature; supplying a first gas including a hydrogen fluoride gas into the processing chamber in which the temperature is adjusted to the first temperature; adjusting the temperature in the processing chamber to a second temperature that is higher than the first temperature; and supplying a second gas including the hydrogen fluoride gas and an ammonia gas into the processing chamber in which the temperature is adjusted to the second temperature.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
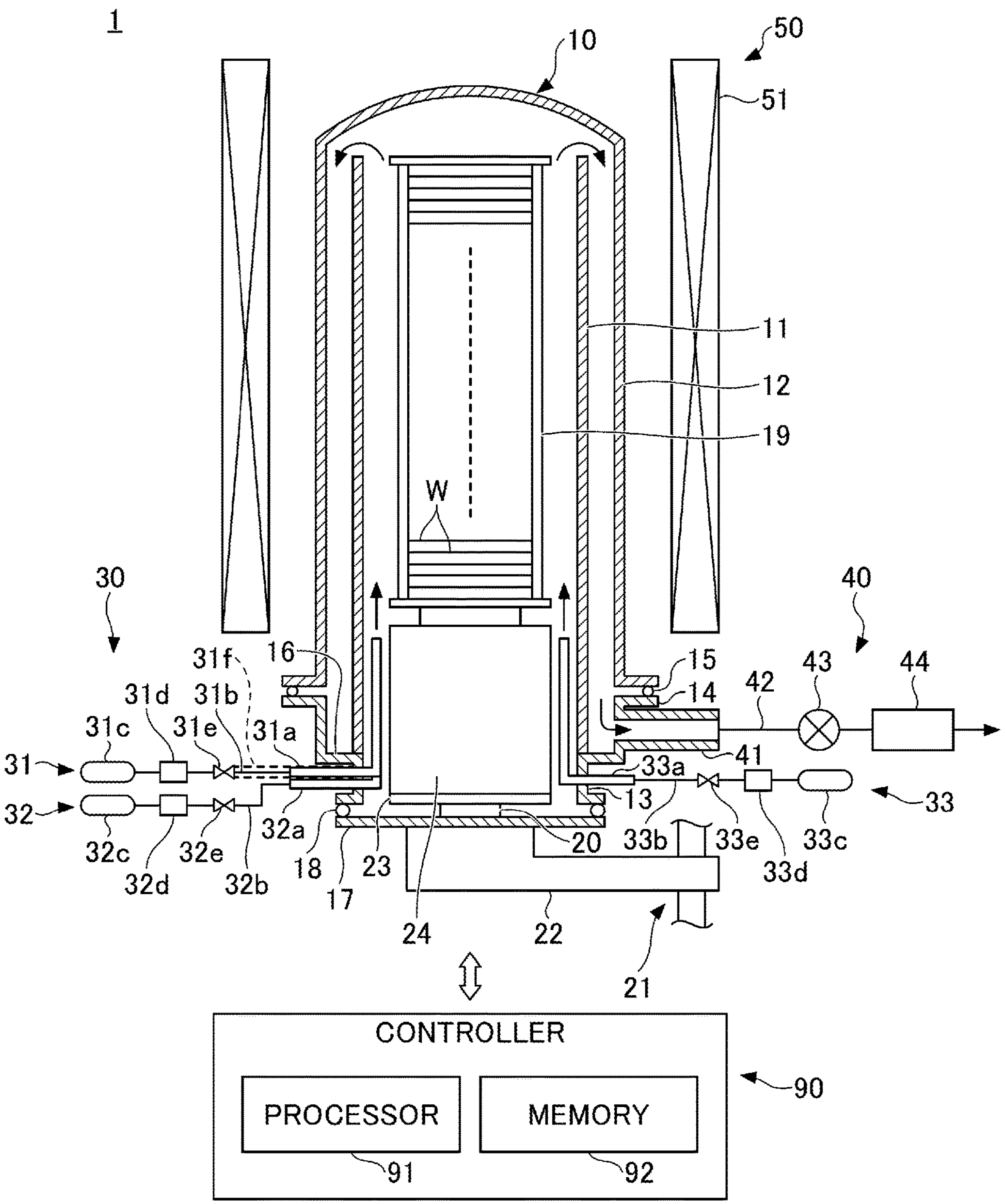
FIG. 1 is a schematic view of a processing apparatus according to an embodiment.

In the following, non-limiting exemplary embodiments of the present disclosure will be described with reference to the accompanying drawings. In the accompanying drawings, the same or corresponding members or components are denoted by the same or corresponding reference numerals and the description thereof will not be repeated.

[Processing Apparatus]

A processing apparatus 1 according to an embodiment will be described with reference to FIG. 1. As illustrated in FIG. 1, the processing apparatus 1 is a batch-type apparatus that performs a process on a plurality of substrates W at the same time. The substrates W may be, for example, semiconductor wafers. The process may include a film deposition process. The process may include an etching process.

The processing apparatus 1 includes a processing chamber 10, a gas supply 30, an exhaust device 40, a heater 50, and a controller 90.

The interior of the processing chamber 10 can be depressurized. The processing chamber 10 accommodates the substrates W. The processing chamber 10 includes an inner tube 11 and an outer tube 12. The inner tube 11 has a cylindrical shape with an open top and an open bottom. The outer tube 12 has a cylindrical shape with an open bottom, has a ceiling on the top, and covers the outer periphery of the inner tube 11. The inner tube 11 and the outer tube 12 are arranged to be concentric to form a double tube structure. The inner tube 11 and the outer tube 12 are both formed of a heat-resistant material such as quartz, for example.

The lower end of the processing chamber 10 is airtightly supported by a manifold 13. The manifold 13 has a cylindrical shape. The manifold 13 is formed of, for example, stainless steel. A flange 14 is formed on the upper end of the manifold 13, and the lower end of the outer tube 12 is disposed on and supported by the flange 14. A seal member 15, such as an O-ring, is interposed between the flange 14 and the lower end of the outer tube 12 to cause the interior of the outer tube 12 to be airtight.

A support 16 having an annular shape is provided on the inner wall of the manifold 13, and the lower end of the inner tube 11 is disposed on and supported by the support 16.

An opening is formed in the lower end of the manifold 13, and a lid 17 is airtightly attached to the lower end of the manifold 13 through a seal member 18, such as an O-ring, such that an opening in the lower end of the processing chamber 10, that is, the opening in the manifold 13 is sealed. The lid 17 is formed of, for example, stainless steel.

A rotating shaft 20, which rotatably supports a boat 19 through a ferrofluidic seal (not illustrated), is attached to the center of the lid 17 so as to pass through the lid 17. The lower end of the rotating shaft 20 is rotatably supported on an arm 22 of a lifting mechanism 21 that includes a boat elevator.

A rotating plate 23 is provided on the upper end of the rotating shaft 20, and the boat 19 is provided above the rotating plate 23 via a heated platform 24 made of quartz. With the configuration, the lid 17 and the boat 19 are integrally moved up and down by raising and lowering the arm 22 of the lifting mechanism 21. Thus, the boat 19 can be inserted into and removed from the processing chamber 10. The boat 19 can be accommodated in the processing chamber 10. The boat 19 substantially horizontally holds the plurality of, for example, 50 to 150 substrates W, such that the substrates W are spaced apart from one another when viewed in the vertical direction.

The gas supply 30 is configured to introduce various processing gases into the processing chamber 10. The gas supply 30 includes a hydrogen fluoride supply 31, an ammonia supply 32, a nitrogen supply 33, and a deposition gas supply (not illustrated).

The hydrogen fluoride supply 31 includes a hydrogen fluoride supply pipe 31*a* in the processing chamber 10, and includes a hydrogen fluoride supply path 31*b* outside the processing chamber 10. A hydrogen fluoride source 31*c*, a mass flow controller 31*d*, and a hydrogen fluoride valve 31*e* are sequentially provided on the hydrogen fluoride supply path 31*b* in order from the upstream side to the downstream side in the gas flow direction. With this configuration, a supply timing of a hydrogen fluoride (HF) gas in the hydrogen fluoride source 31*c* is controlled by the hydrogen fluoride valve 31*e*, and further the flow rate of the hydrogen fluoride gas is adjusted to a predetermined flow rate by the mass flow controller 31*d*. The hydrogen fluoride gas flows from the hydrogen fluoride supply path 31*b* into the hydrogen fluoride supply pipe 31*a*, and is discharged from the hydrogen fluoride supply pipe 31*a* into the processing chamber 10.

The ammonia supply 32 includes an ammonia supply pipe 32*a* in the processing chamber 10, and includes an ammonia supply path 32*b* outside the processing chamber 10. An ammonia source 32*c*, a mass flow controller 32*d*, and an ammonia valve 32*e* are sequentially provided on the ammonia supply path 32*b* in order from the upstream side to the downstream side in the gas flow direction. With this configuration, a supply timing of an ammonia ($NH_3$) gas in the ammonia source 32*c* is controlled by the ammonia valve 32*e*, and further the flow rate of the ammonia gas is adjusted to a predetermined flow rate by the mass flow controller 32*d*. The ammonia gas flows from the ammonia supply path 32*b* into the ammonia supply pipe 32*a*, and is discharged from the ammonia supply pipe 32*a* into the processing chamber 10.

The nitrogen supply 33 includes a nitrogen supply pipe 33*a* in the processing chamber 10, and includes a nitrogen supply path 33*b* outside the processing chamber 10. A nitrogen source 33*c*, a mass flow controller 33*d*, and a nitrogen valve 33*e* are sequentially provided on the nitrogen supply path 33*b* in order from the upstream side to the downstream side in the gas flow direction. With this configuration, a supply timing of a nitrogen ($N_2$) gas in the nitrogen source 33*c* is controlled by the nitrogen valve 33*e*, and further the flow rate of the nitrogen gas is adjusted to a predetermined flow rate by the mass flow controller 33*d*. The nitrogen gas flows from the nitrogen supply path 33*b* into the nitrogen supply pipe 33*a*, and is discharged from the nitrogen supply pipe 33*a* into the processing chamber 10. The nitrogen gas is an example of an inert gas.

Each of the gas supply pipes (the hydrogen fluoride supply pipe 31*a*, the ammonia supply pipe 32*a*, and the nitrogen supply pipe 33*a*) is formed of, for example, quartz. Each of the gas supply pipes is fixed to the manifold 13. Each of the gas supply pipes extends linearly in the vicinity of the inner tube 11 along the vertical direction, bends in an L-shape in the manifold 13, and extends in the horizontal direction so as to pass through the manifold 13. The gas supply pipes are provided along the circumferential direction of the inner tube 11 at the same height. Each of the gas supply pipes has an opening in its tip located inside the inner tube 11, and discharges the gas upward through the opening within the processing chamber 10.

A heater 31*f* is attached to the hydrogen fluoride supply pipe 31*a* and the hydrogen fluoride supply path 31*b*. The heater 31*f* heats hydrogen fluoride flowing in the hydrogen fluoride supply pipe 31*a* and the hydrogen fluoride supply path 31*b* so as to suppress corrosion of the hydrogen fluoride supply pipe 31*a* and the hydrogen fluoride supply path 31*b* by the hydrogen fluoride gas. The heater 31*f* includes, for example, a pipe heater, a cartridge heater, or a combination thereof. The heater 31*f* may be attached to either the hydrogen fluoride supply pipe 31*a* or the hydrogen fluoride supply path 31*b*.

The deposition gas supply may have a configuration similar to those of the other supplies (the hydrogen fluoride supply 31, the ammonia supply 32, and the nitrogen supply 33). Similar to the other supplies, the deposition gas supply includes a deposition gas supply pipe, a deposition gas supply path, a deposition gas source, a mass flow controller, and a deposition gas valve.

The gas supply 30 may mix different gases and discharge a gas mixture of the gases from one supply pipe. The gas supply pipes (the hydrogen fluoride supply pipe 31*a*, the ammonia supply pipe 32*a*, the nitrogen supply pipe 33*a*, and the deposition gas supply pipe) may have different shapes and different arrangements. The gas supply may be configured to supply any other gas, in addition to the hydrogen fluoride gas, the ammonia gas, the nitrogen gas, and the deposition gas.

The exhaust device 40 exhausts the gas that flows from the interior of the inner tube 11 through a space between the inner tube 11 and the outer tube 12 into a gas outlet 41. The gas outlet 41 is formed in the side wall of the upper portion of the manifold 13 so as to be situated above the support 16. An exhaust passage 42 is connected to the gas outlet 41. A pressure regulating valve 43 and a vacuum pump 44 are sequentially provided on the exhaust passage 42 in order from the upstream side to the downstream side in the gas flow direction. The controller 90 controls the exhausting device 40 to operate the pressure regulating valve 43 and the vacuum pump 44, and thus the pressure in the processing chamber 10 is controlled by the pressure regulating valve 43, while the gas in the processing chamber 10 is suctioned by the vacuum pump 44.

The heater 50 includes a cylindrical heater 51 that surrounds the outer tube 12 and is located radially outward relative to the outer tube 12. The heater 51 heats the substrates W accommodated in the processing chamber 10 by heating the entire outer periphery of the processing chamber 10.

The controller 90 may be implemented by a computer that includes one or more processors 91, a memory 92, an input/output interface (not illustrated), and an electronic circuit (not illustrated). Such a processor 91 may be a combination of one or more of a central processing unit (CPU), an application specific integrated circuit (ASIC), a field programmable gate array (FPGA), a circuit with multiple discrete semiconductors, and the like. The memory 92 may include a volatile memory and a nonvolatile memory (for example, a compact disc, a digital versatile disc (DVD), a hard disk, a flash memory, and the like). The memory 92 stores a program that causes the processing apparatus 1 to operate, and stores a recipe such as processing conditions of substrate processing. By executing the program and the recipe stored in the memory 92, the processor 91 controls each component of the processing apparatus 1 to perform a cleaning method as will be described below.

[Cleaning Method]

Figure 2:
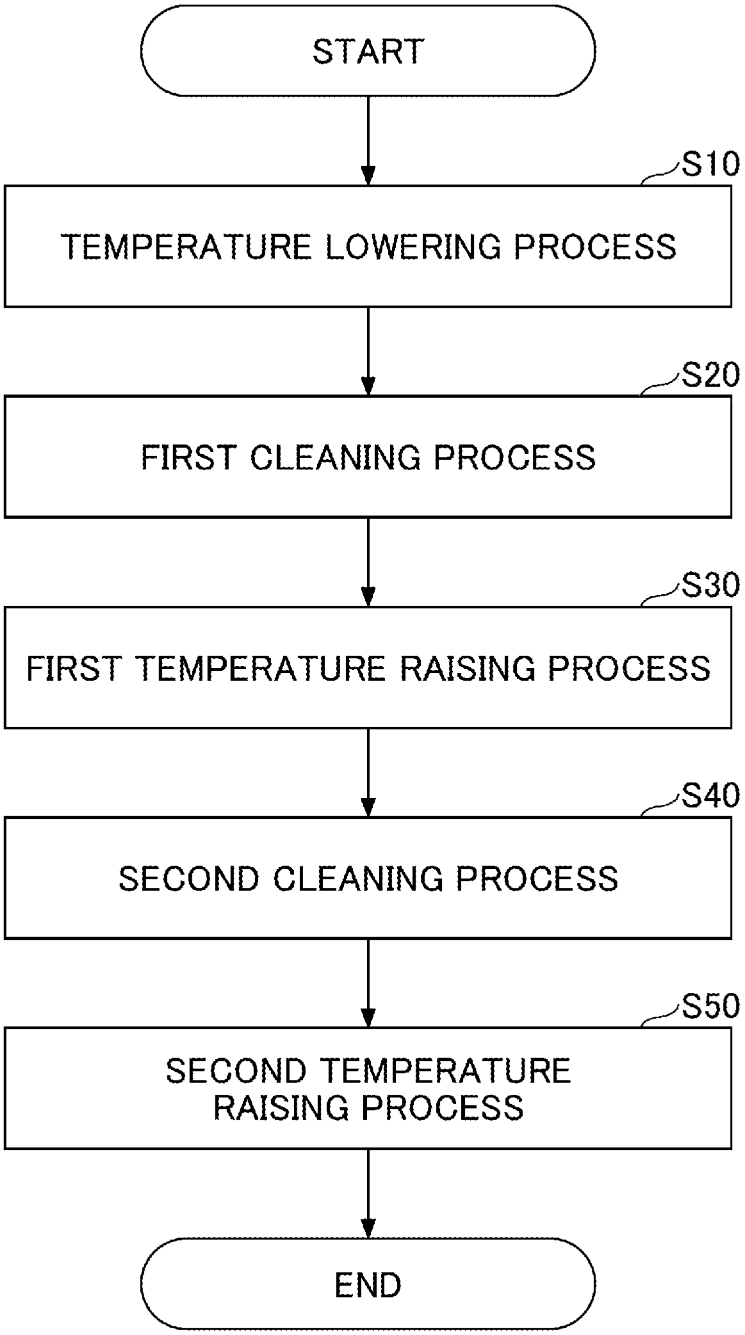
FIG. 2 is a flowchart illustrating a cleaning method according to an embodiment.

A cleaning method according to an embodiment will be described with reference to FIG. 2. As illustrated in FIG. 2, the cleaning method according to the embodiment includes a temperature lowering process S10, a first cleaning process S20, a first temperature raising process S30, a second cleaning process S40, and a second temperature raising process S50.

In the temperature lowering process S10, the temperature in the processing chamber, maintained at a deposition temperature for performing the film deposition process, is lowered to a first temperature for performing the first cleaning process S20. The film deposition process may be a process for depositing, for example, a silicon oxide film. The deposition temperature is, for example, 350° C. The first temperature is, for example, a room temperature. The room temperature is a temperature in a clean room in which the processing chamber is placed, and is, for example, ° C.

The first cleaning process S20 is performed after the temperature lowering process S10. In the first cleaning process S20, a first gas that includes the hydrogen fluoride gas and does not include the ammonia gas is supplied into the processing chamber in which the temperature is adjusted to the first temperature. As a result, deposits that include silicon oxide adhering to the interior of the processing chamber are removed. In the cleaning using the hydrogen fluoride gas, the etching rate is high. Therefore, deposits adhering to the interior of the processing chamber can be removed in a short period of time. However, in the cleaning using the hydrogen fluoride gas, as the temperature of the hydrogen fluoride gas increases, the etching rate decreases. Therefore, if an area that is higher in temperature than other areas is present in the processing chamber, some deposits may remain in the area without being etched. In the first cleaning process S20, the first gas may be heated to a third temperature and supplied. The third temperature is higher than the first temperature.

The first temperature raising process S30 is performed after the first cleaning process S20. In the first temperature raising process S30, the temperature in the processing chamber maintained at the first temperature is raised to a second temperature for performing the second cleaning process S40. The second temperature is higher than the first temperature, and is, for example, 65° C. or higher and 100° C. or lower.

The second cleaning process S40 is performed after the first temperature raising process S30. In the second cleaning process S40, deposits adhering to the interior of the processing chamber are removed by chemical oxide removal (COR) that performs chemical etching. Specifically, a second gas that includes the hydrogen fluoride gas and the ammonia gas is supplied into the processing chamber in which the temperature is adjusted to the second temperature. Then, the hydrogen fluoride gas and the ammonia gas are reacted with silicon oxide to produce ammonium silicofluoride ($(NH_4)_2SiF_6$), which is then sublimated by heating. Accordingly, deposits adhering to the interior of the processing chamber can be removed. In the COR, although the etching rate is low, the entirety of the interior of the processing chamber can be etched. Accordingly, deposits remaining without being etched in the first cleaning process S20 can be removed.

The second temperature raising process S50 is performed after the second cleaning process S40. In the second temperature raising process S50, the temperature in the processing chamber maintained at the second temperature is raised to the deposition temperature for performing the film deposition process. Accordingly, the film deposition process can be started again in the processing chamber. The cleaning method according to the embodiment ends.

In the cleaning method according to the above-described embodiment, the first cleaning process S20 and the second cleaning process S40 are performed in this order. In the first cleaning process S20, deposits adhering to the interior of the processing chamber are removed by the hydrogen fluoride gas. Therefore, deposits adhering to the interior of the processing chamber can be removed in a short period of time. However, in the first cleaning process S20, some deposits may remain without being etched in an area that is higher in temperature than other areas in the processing chamber. In the second cleaning process S40, deposits adhering to the interior of the processing chamber are removed by COR. Therefore, the entirety of the interior of the processing chamber can be etched, and thus deposits remaining without being etched in the first cleaning process S20 can be removed. Accordingly, film residues remaining when removing deposits in the processing chamber can be reduced.

Figure 3:
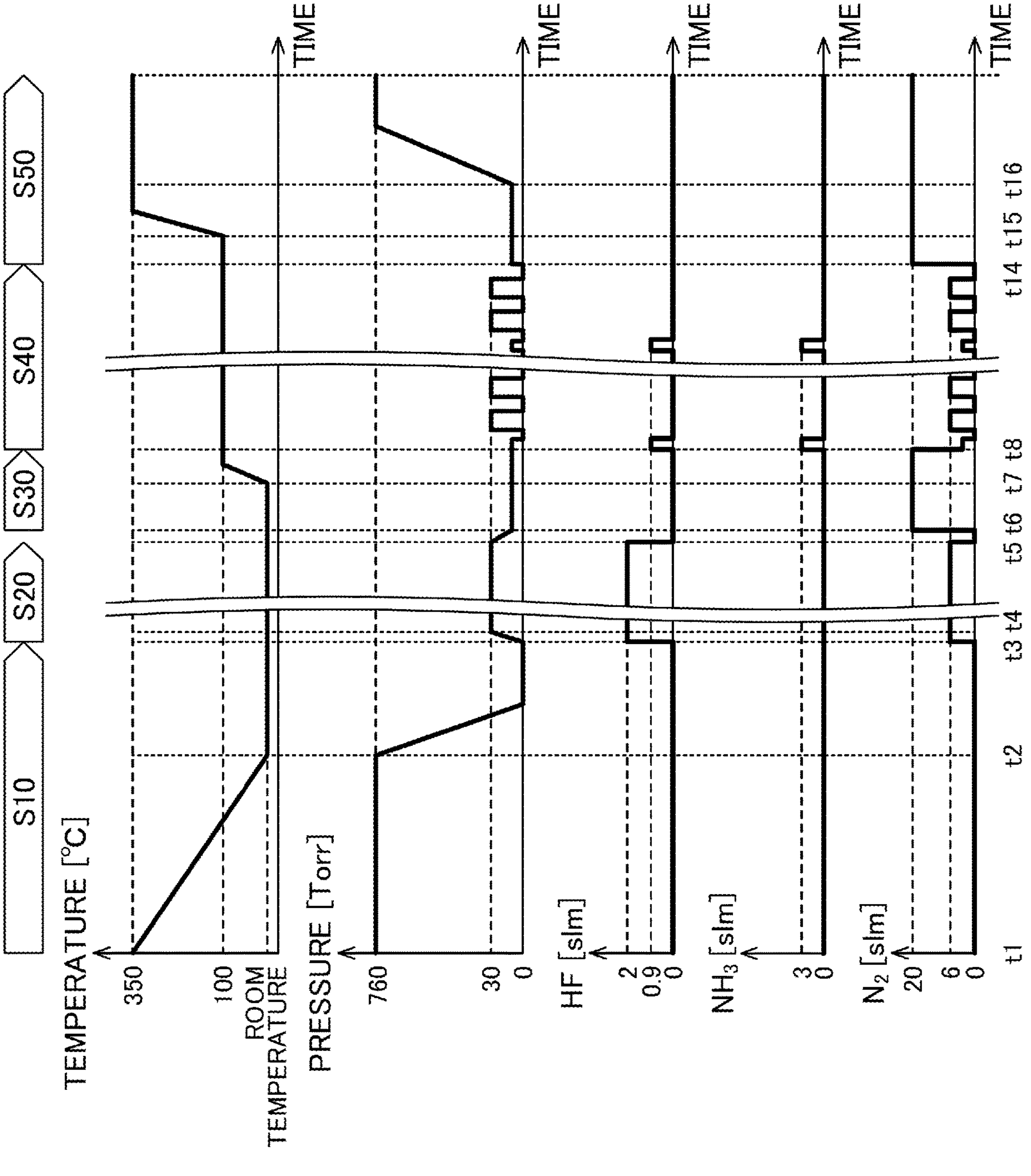
FIG. 3 is a timing chart illustrating the cleaning method according to the embodiment.
Figure 4:
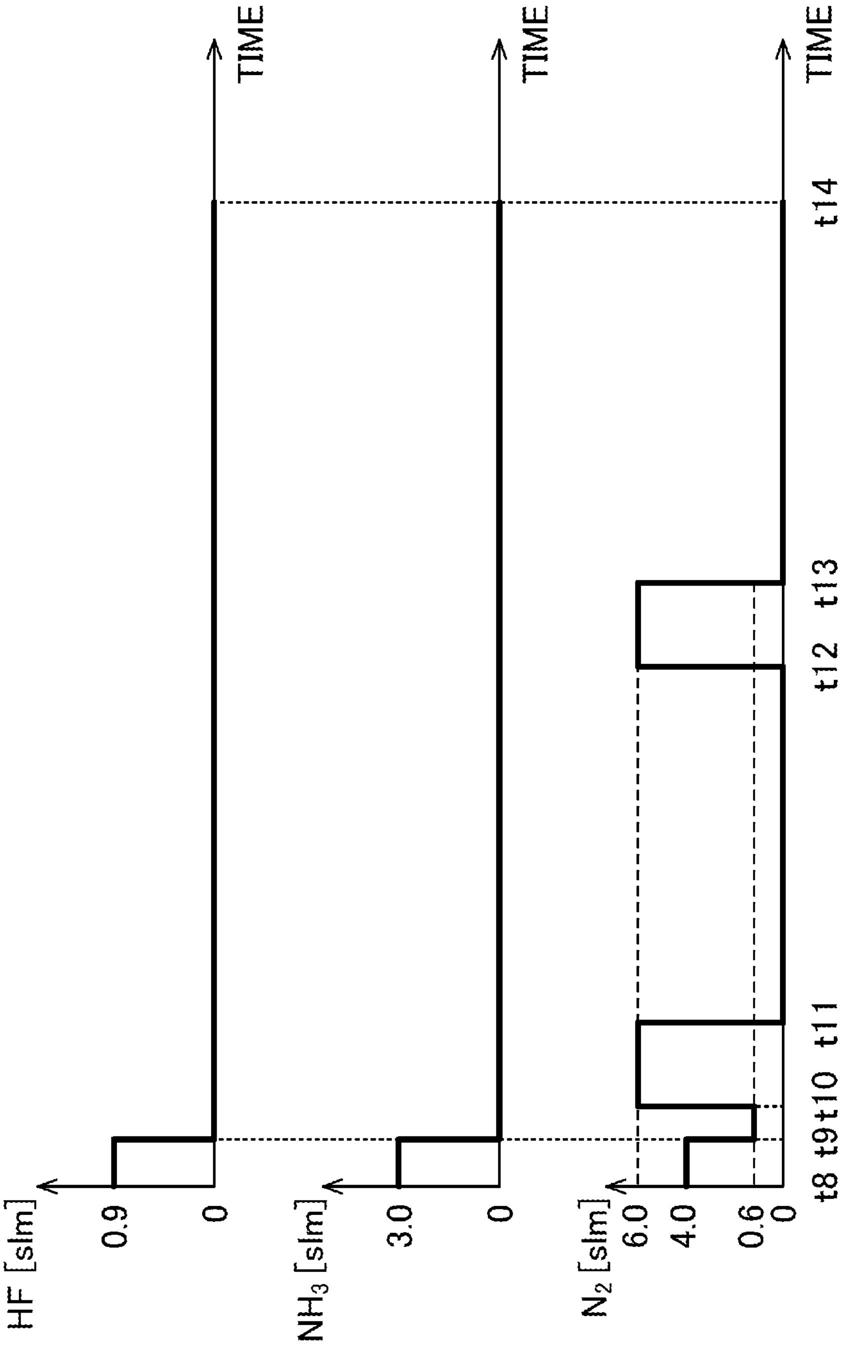
FIG. 4 is a timing chart illustrating one cycle of a second cleaning process.

Next, the operation of the processing apparatus 1 when the cleaning method is performed will be described with reference to FIGS. 3 and 4. The cleaning method according to the embodiment will be performed after the film deposition process is performed one or more times by the processing apparatus 1.

First, the controller 90 controls the lifting mechanism 21 to raise the lid 17 and cause the lid 17 to contact the manifold 13, such that the processing chamber 10 is airtightly sealed.

Next, at a time point t1, the controller starts the temperature lowering process S10. At the time point t1, the controller 90 causes the heater 51 to stop heating. Accordingly, the temperature in the processing chamber 10, maintained at the deposition temperature for performing the film deposition process, is gradually lowered and reaches the first temperature for performing the first cleaning process S20. The deposition temperature is, for example, 350° C. The first temperature is a temperature in a clean room in which the processing apparatus 1 is placed, and, is for example, a room temperature. In the temperature lowering process S10, the controller 90 may use a coolant to forcibly cool the interior of the processing chamber 10.

Next, at a time point t2 at which the temperature in the processing chamber 10 has reached the first temperature, the controller 90 causes the vacuum pump 44 to suction the gas in the processing chamber 10 while increasing the degree of opening of the pressure regulating valve 43 from 0%. As a result, the pressure in the processing chamber 10 gradually decreases from the atmospheric pressure (760 Torr), and reaches, for example, 30 Torr (4 kPa) or less.

Next, at a time point t3 at which the pressure in the processing chamber 10 has reached 30 Torr or less, the controller 90 starts the first cleaning process S20. At the time point t3, the controller 90 opens the hydrogen fluoride valve 31*e*, and supplies the hydrogen fluoride gas from the hydrogen fluoride source 31*c* through the hydrogen fluoride supply path 31*b* and the hydrogen fluoride supply pipe 31*a* into the processing chamber 10. In addition, in accordance with the supply of the hydrogen fluoride gas, the controller 90 opens the nitrogen valve 33*e*, and supplies the nitrogen gas from the nitrogen source 33*c* through the nitrogen supply path 33*b* and the nitrogen supply pipe 33*a* into the processing chamber 10. By supplying the nitrogen gas in addition to the hydrogen fluoride gas, the uniformity of etching in the height direction of the processing chamber 10 can be easily controlled. Further, the controller 90 controls the mass flow controller 31*d* to adjust the flow rate of the hydrogen fluoride gas to, for example, 2 slm, and controls the mass flow controller 33*d* to adjust the flow rate of the nitrogen gas to, for example, 6 slm. At the time point t3, the controller 90 controls the degree of opening of the pressure regulating valve 43 and adjusts the pressure in the processing chamber 10 to, for example, 30 Torr (4 kPa). When the hydrogen fluoride gas is supplied from the hydrogen fluoride source 31*c* into the processing chamber 10, the controller 90 may operate the heater 31*f* to heat the hydrogen fluoride gas, flowing in the hydrogen fluoride supply pipe 31*a* and the hydrogen fluoride supply path 31*b*, to the third temperature. The third temperature may be a temperature that does not cause corrosion of the hydrogen fluoride supply pipe 31*a* and the hydrogen fluoride supply path 31*b* by hydrogen fluoride. Accordingly, corrosion of the hydrogen fluoride supply pipe 31*a* and the hydrogen fluoride supply path 31*b* by the hydrogen fluoride gas can be suppressed.

Next, until a first period of time elapses from a time point t4 at which the pressure in the processing chamber 10 has reached 30 Torr, the controller 90 continues to supply the hydrogen fluoride gas and the nitrogen gas into the processing chamber 10. The first period of time may be determined in accordance with the amount of deposits adhering to the interior of the processing chamber 10.

Next, at a time point t5 at which the first period of time has elapsed from the time point t4, the controller 90 ends the first cleaning process S20. At the time point t5, the controller 90 closes the hydrogen fluoride valve 31*e* and the nitrogen valve 33*e*, and stops the supply of the hydrogen fluoride gas and the nitrogen gas into the processing chamber 10. As a result, the pressure in the processing chamber 10 decreases.

In the first cleaning process S20, deposits that include silicon oxide adhering to the interior of the processing chamber 10 are removed by the hydrogen fluoride gas being supplied into the processing chamber 10. In the cleaning using the hydrogen fluoride gas, the etching rate is high, and thus deposits can be removed in a short period of time. However, in the cleaning using the hydrogen fluoride gas, as the temperature of the hydrogen fluoride gas increases, the etching rate decreases. Therefore, if an area that is higher in temperature than other areas is present in the processing chamber 10, some deposits may remain in the area without being etched. For example, in a space between the inner tube 11 and the outer tube 12, an area, corresponding to the position where the hydrogen fluoride supply pipe 31*a* extends vertically, tends to be heated by the heat of the hydrogen fluoride gas heated by the heater 31*f* and flowing in the fluoride supply pipe 31*a*, and thus, deposits tend to remain in the vicinity of the area.

Next, at a time point t6 at which the pressure in the processing chamber 10 has decreased, the controller 90 starts the first temperature raising process S30. At the time point t6, the controller 90 opens the nitrogen valve 33*e*, and supplies the nitrogen gas from the nitrogen source 33*c* through the nitrogen supply path 33*b* and the nitrogen supply pipe 33*a* into the processing chamber 10. Further, the controller 90 controls the mass flow controller 33*d* to adjust the flow rate of the nitrogen gas to, for example, 20 slm. As a result, the remaining hydrogen fluoride gas in the processing chamber 10 is replaced with the nitrogen gas.

Next, at a time point t7 at which a predetermined period of time elapses from the time point t6, the controller 90 operates the heater 51 to heat the interior of the processing chamber 10. The temperature in the processing chamber 10 is gradually raised by the heating of the heater 51, and reaches the second temperature for performing the second cleaning process S40. The second temperature is, for example, 100° C.

Next, at a time point t8 at which a predetermined period of time has elapsed from the time point t7, the controller 90 starts the second cleaning process S40. At the time point t8, while the controller 90 continues to supply the nitrogen gas into the processing chamber 10, the controller 90 opens the hydrogen fluoride valve 31*e*, and supplies the hydrogen fluoride gas from the hydrogen fluoride source 31*c* through the hydrogen fluoride supply path 31*b* and the hydrogen fluoride supply pipe 31*a* into the processing chamber 10. In addition, in accordance with the supply of the hydrogen fluoride gas, the controller 90 opens the ammonia valve 32*e*, and supplies the ammonia gas from the ammonia source 32*c* through the ammonia supply path 32*b* and the ammonia supply pipe 32*a* into the processing chamber 10. Further, the controller 90 controls the mass flow controller 31*d* to adjust the flow rate of the hydrogen fluoride gas to, for example, 0.9 slm. Further, the controller 90 controls the mass flow controller 32*d* to adjust the flow rate of the ammonia gas to, for example, 3 slm. Further, the controller 90 controls the mass flow controller 33*d* to adjust the flow rate of the nitrogen gas to, for example, 4 slm.

Next, at a time point t9 at which a predetermined period of time (for example, one minute) has elapsed from the time point t8, the controller 90 closes the hydrogen fluoride valve 31*e* and the ammonia valve 32*e*, and stops the supply of the hydrogen fluoride gas and the ammonia gas into the processing chamber 10. The controller 90 controls the mass flow controller 33*d* to adjust the flow rate of the nitrogen gas to, for example, 0.6 slm.

Next, at a time point t10 at which a predetermined period of time has elapsed from the time point t9, the controller 90 controls the mass flow controller 33*d* to adjust the flow rate of the nitrogen gas to, for example, 6 slm. As a result, the remaining hydrogen fluoride gas and the remaining ammonia gas in the processing chamber 10 are replaced with the nitrogen gas.

Next, at a time point t11 at which a predetermined period of time has elapsed from the time point t10, the controller 90 closes the nitrogen valve 33*e*, and stops the supply of the nitrogen gas into the processing chamber 10.

Next, at a time point t12 at which a predetermined period of time has elapsed from the time point t11, the controller 90 opens the nitrogen valve 33*e*, and supplies the nitrogen gas from the nitrogen source 33*c* through the nitrogen supply path 33*b* and the nitrogen supply pipe 33*a* into the processing chamber 10. Further, the controller 90 controls the mass flow controller 33*d* to adjust the flow rate of the nitrogen gas to, for example, 6 slm. As a result, the remaining hydrogen fluoride gas and the remaining ammonia gas in the processing chamber 10 are replaced with the nitrogen gas.

Next, at a time point t13 at which a predetermined period of time has elapsed from the time point t12, the controller 90 closes the nitrogen valve 33*e*, and stops the supply of the nitrogen gas into the processing chamber 10. The controller 90 continues to stop the supply of the nitrogen gas into the processing chamber 10 until a time point t14.

The controller 90 sets the time point t8 to the time point t14 as one cycle, repeats this cycle a plurality of times, and ends the second cleaning process S40. As described, in the second cleaning process S40, the temperature in the processing chamber 10 is adjusted to the second temperature, and a step of simultaneously supplying the hydrogen fluoride and the ammonia gas into the processing chamber 10 and a step of supplying only the nitrogen gas into the processing chamber 10 are repeated a plurality of times.

In the second cleaning process S40, deposits adhering to the interior of the processing chamber 10 are removed by COR. That is, the hydrogen fluoride gas and the ammonia gas are reacted with silicon oxide to produce ammonium silicofluoride ($(NH_4)_2SiF_6$), which is then sublimated by heating. Accordingly, deposits adhering to the interior of the processing chamber 10 can be removed. In the COR, although the etching rate is low, the entirety of the interior of the processing chamber 10 can be etched. Accordingly, deposits remaining without being etched in the first cleaning process S20 can be removed.

Next, at a time point t14, the controller starts the second temperature raising process S50. At the time point t14, the controller 90 controls the mass flow controller 33*d* to adjust the flow rate of the nitrogen gas to, for example, 20 slm.

Next, at a time point t15 at which a predetermined period of time has elapsed from the time point t14, the controller 90 operates the heater 51 to heat the interior of the processing chamber 10. The temperature in the processing chamber 10 is gradually raised by the heating of the heater 51, and reaches the deposition temperature for performing the film deposition process.

Next, at a time point t16 at which the temperature in the processing chamber 10 has reached the deposition temperature, the controller 90 stops the suction of the gas in the processing chamber 10 by the vacuum pump 44. As a result, the pressure in the processing chamber 10 gradually increases and reaches the atmospheric pressure (760 Torr).

Next, the controller 90 controls the lifting mechanism 21 to lower the lid 17 and cause the lid 17 to be spaced apart from the manifold 13, thereby opening the processing chamber 10.

As described, in the cleaning method performed by the processing apparatus 1 according to the embodiment, deposits that include silicon oxide adhering to the interior of the processing chamber can be removed.

In the cleaning method according to the above-described embodiment, the first cleaning process S20 and the second cleaning process S40 are performed in a state in which the boat 19 is not accommodated in the processing chamber 10; however, the cleaning method according to the above-described embodiment is not limited thereto. For example, the first cleaning process S20 and the second cleaning process S40 may be performed in a state in which the boat 19 is accommodated in the processing chamber 10. In this case, when deposits adhering to the interior of the processing chamber 10 are removed, deposits adhering to the boat 19 can also be removed.

According to an embodiment of the present disclosure, film residues remaining when removing deposits in a processing chamber can be reduced.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A cleaning method for removing a deposit including silicon oxide in a processing chamber, the cleaning method comprising:
- adjusting a temperature in the processing chamber to a first temperature;
- supplying a first gas including a hydrogen fluoride gas that is heated to a third temperature, into the processing chamber in which the temperature is adjusted to the first temperature, such that the deposit is removed from the processing chamber when reaching the first temperature, wherein the third temperature is higher than the first temperature;
- adjusting the temperature in the processing chamber to a second temperature that is higher than the first temperature;
- supplying a second gas including the hydrogen fluoride gas and an ammonia gas into the processing chamber in which the temperature is adjusted to the second temperature;
- reacting the hydrogen fluoride gas and the ammonia gas with the silicon oxide to produce ammonium silicofluoride; and
- sublimating the ammonium silicofluoride by heating, such that a portion of the deposit that remains unetched after supplying the first gas is removed from the processing chamber when reaching the second temperature.

2. The cleaning method according to claim 1, wherein the first temperature is a room temperature, and the second temperature is 65° C. or higher and 100° C. or lower.

3. The cleaning method according to claim 1, wherein the supplying of the second gas includes repeating a cycle including:
- simultaneously supplying the hydrogen fluoride gas and the ammonia gas into the processing chamber, and
- supplying an inert gas into the processing chamber without supplying the hydrogen fluoride gas and the ammonia gas.

4. A processing apparatus comprising:
- a processing chamber;
- a gas supply configured to supply a processing gas into the processing chamber;
- a heater configured to heat the processing chamber; and
- a controller configured to control the gas supply and the heater to perform a process including:
  - adjusting a temperature in the processing chamber to a first temperature;
  - supplying a first gas including a hydrogen fluoride gas that is heated to a third temperature, into the processing chamber in which the temperature is adjusted to the first temperature, such that a deposit is removed from the processing chamber when reaching the first temperature, wherein the third temperature is higher than the first temperature and the deposit includes silicon oxide;
  - raising the temperature in the processing chamber to a second temperature that is higher than the first temperature;
  - supplying a second gas including the hydrogen fluoride gas and an ammonia gas into the processing chamber in which the temperature is adjusted to the second temperature;
  - reacting the hydrogen fluoride gas and the ammonia gas with the silicon oxide to produce ammonium silicofluoride; and
  - sublimating the ammonium silicofluoride by heating, such that a portion of the deposit that remains unetched after supplying the first gas is removed from the processing chamber when reaching the second temperature.

* * * * *